United States Patent [19]

Claassen

[11] 4,210,435
[45] Jul. 1, 1980

[54] METHOD OF MAKING ACCENT LINES IN BENT GLASS SHEETS

[75] Inventor: George R. Claassen, New Kensington, Pa.

[73] Assignee: PPG Industries, Inc., Pittsburgh, Pa.

[21] Appl. No.: 26,107

[22] Filed: Apr. 2, 1979

[51] Int. Cl.² ............................................. C03B 23/02
[52] U.S. Cl. ........................................ 65/106; 65/273; 65/287
[58] Field of Search .................. 65/106, 107, 273, 275, 65/287

[56] References Cited

U.S. PATENT DOCUMENTS

| | | | |
|---|---|---|---|
| 3,089,727 | 5/1963 | Hay | 294/118 |
| 3,367,764 | 2/1968 | Seymour | 65/291 |
| 3,795,501 | 3/1974 | Jansson et al. | 65/106 |
| 3,795,570 | 3/1974 | Jansson et al. | 65/100 |
| 3,879,184 | 4/1975 | Hamilton et al. | 65/107 |
| 4,081,263 | 3/1978 | Mestre et al. | 65/106 |

Primary Examiner—Arthur D. Kellogg
Attorney, Agent, or Firm—Dennis G. Millman

[57] ABSTRACT

An accent line is produced in a glass sheet by pressing a rod-shaped member against the glass sheet as it is being press bent. The rod-shaped member may be heated electrically or by passage through a furnace along with the glass sheet.

5 Claims, 8 Drawing Figures

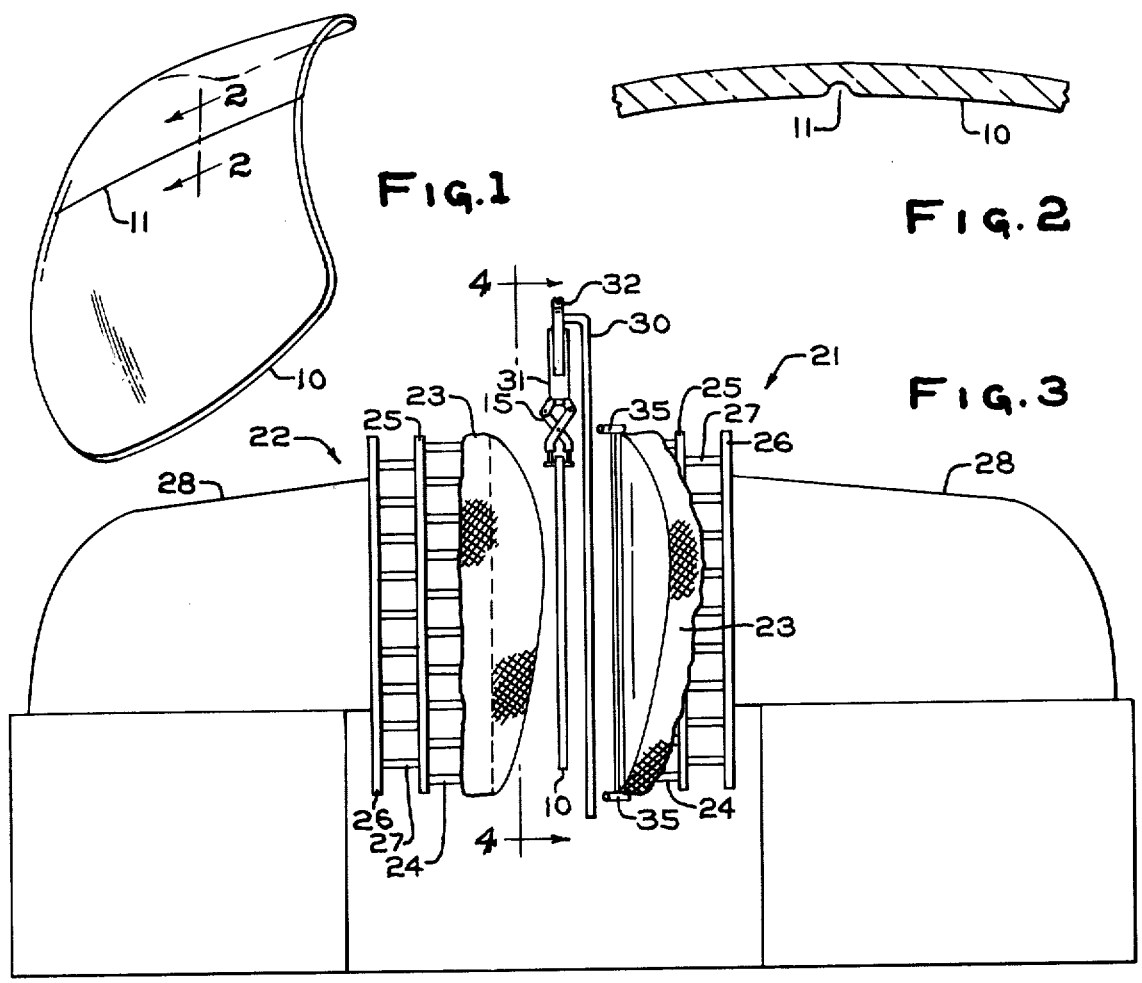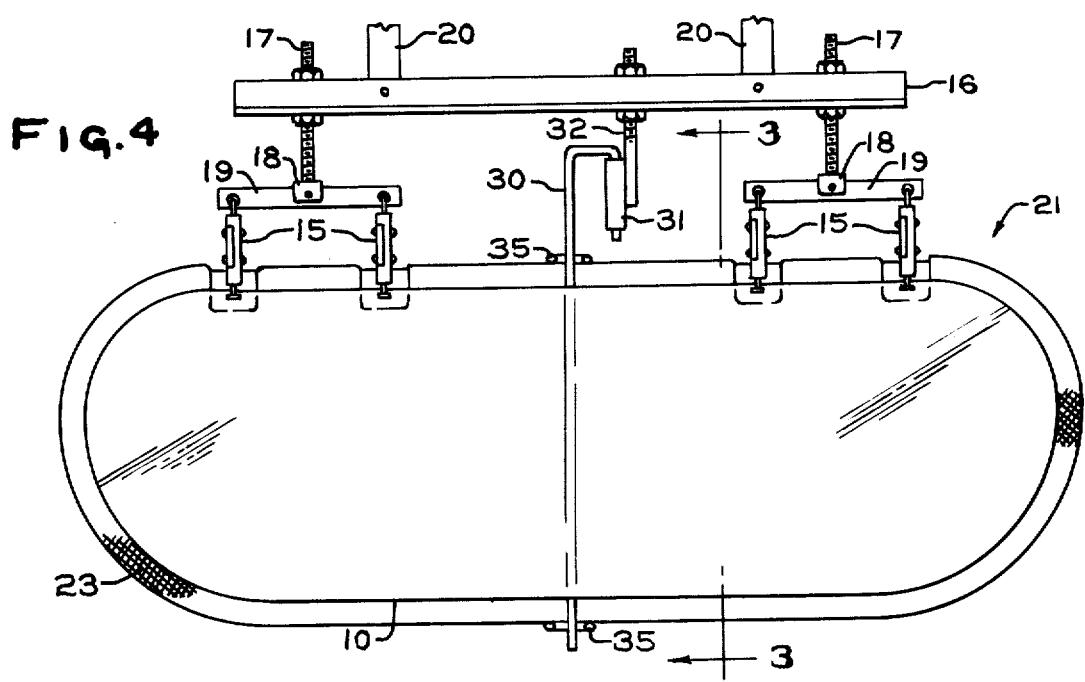

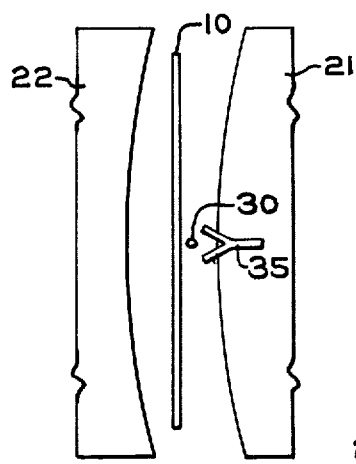
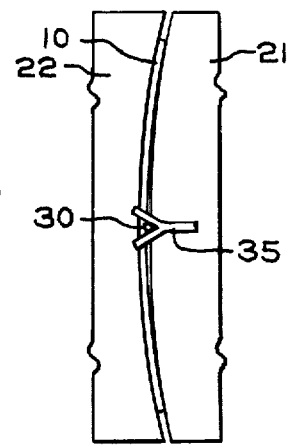
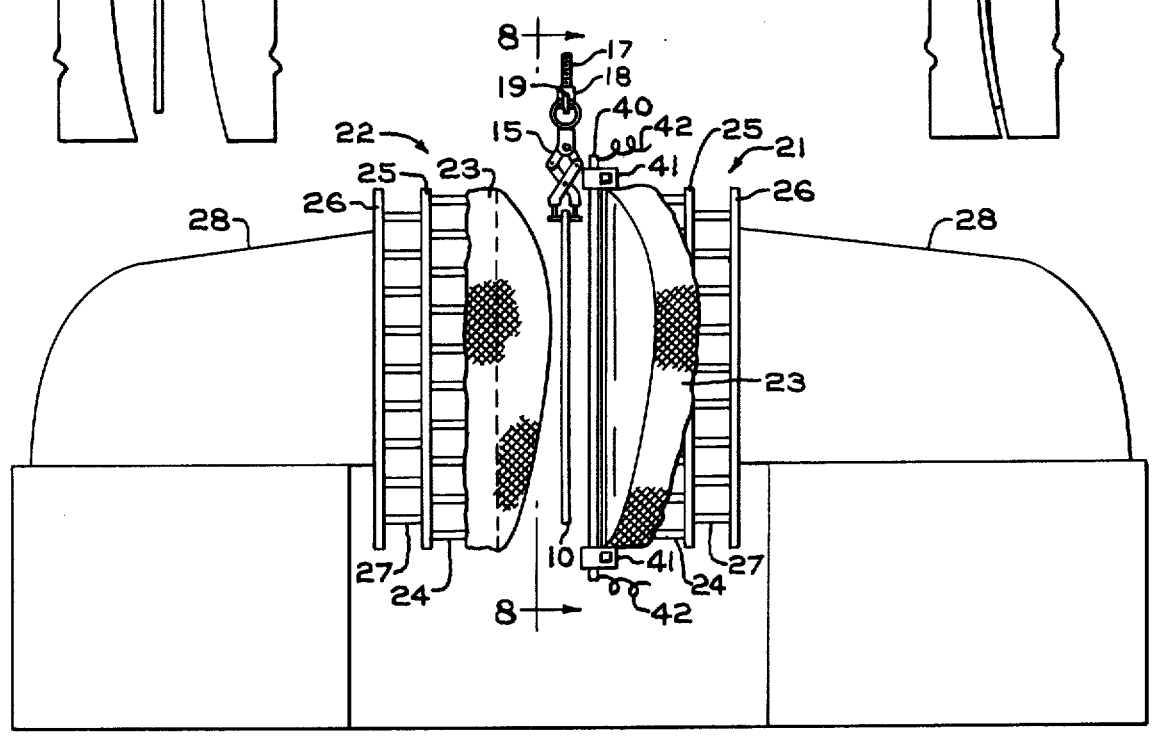
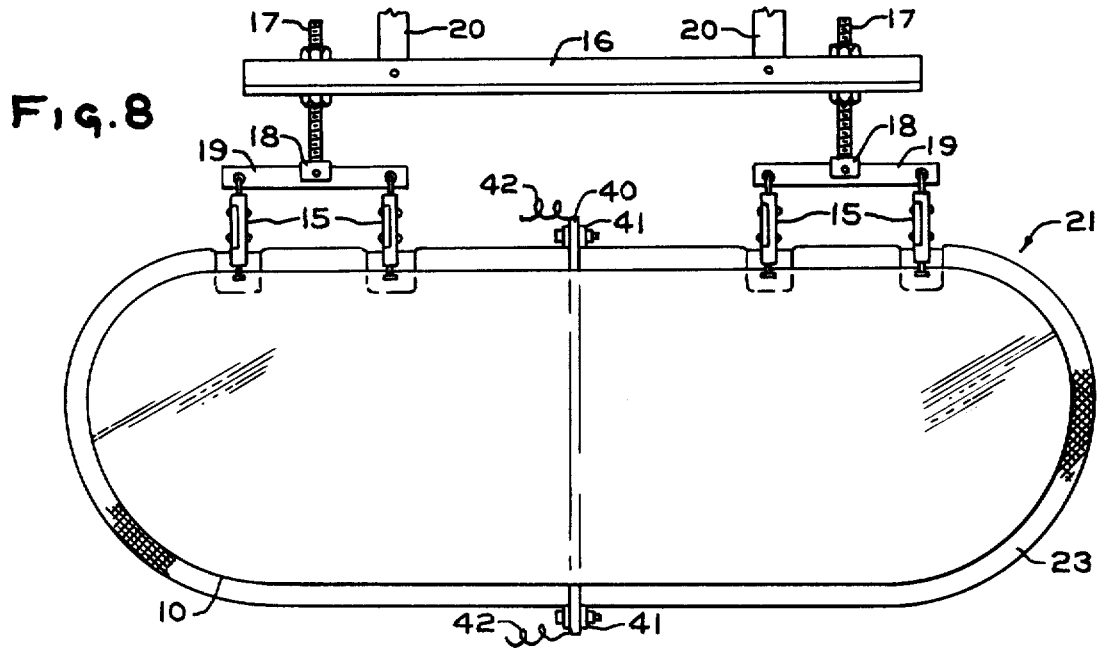

METHOD OF MAKING ACCENT LINES IN BENT GLASS SHEETS

BACKGROUND OF THE INVENTION

Automotive designers have from time to time deemed it desirable to provide automobile windows with accent lines, particularly the rear window or "backlight" of an automobile. Such an accent line gives the illusion of two sheets of glass butted together, or of a much more sharply bent portion than is actually provided.

Prior to the present invention, the customary way of providing such an accent line on a piece of glass has been to grind a groove into the glass surface prior to bending. Since such a technique entails a separate process step which adds to production costs, a different technique for providing an accent line would be desirable. Accordingly, it is an object of the present invention to create an accent line in a glass sheet simultaneously with the bending thereof.

U.S. Pat. No. 4,081,263 discloses the use of a rod or cylinder as a fulcrum for initiating the bending of a glass sheet to a sharp curvature. Such a procedure is not pertinent to the production of an accent line of the type to which the present invention pertains since actual sharp bending of the glass sheet is basically different from producing an accent line. Rather, an accent line is an impression in the glass surface at a location on the glass sheet otherwise possessing a relatively gentle curvature. For these reasons, the rather substantial body of prior art relating to the production of "V-bends" in glass sheets is not pertinent to the present invention. Additional examples of such prior art V-bending techniques may be found in U.S. Pat. Nos. 3,795,570 and 3,795,501.

SUMMARY OF THE INVENTION

The present invention provides a method for imparting an accent line to the surface of a glass sheet as it is being shaped by an otherwise conventional press bending technique. A rigid rod-shaped member is supported in the press bending station between the glass sheet and the face of one of the press bending molds. When the bending molds close upon the glass sheet to impart an overall curvature thereto, the rod member is pressed into a surface of the glass sheet so as to create a line of distortion which appears as an accent line.

In order to avoid localized cooling of the heat-softened glass sheet along the line of contact with the rod member, it has been found necessary to heat the rod member. Such localized cooling of the glass sheet should be avoided because it can give rise to undesirable, unbalanced stresses in the glass which can cause cracking or weakening of the glass. Two specific embodiments for heating the rod are disclosed herein. In the first embodiment, a rod is carried on each carriage means employed for conveying the glass sheets through a heating furnace, whereby the rods become heated at the same time as the glass sheets. Each heated rod, along with a heat-softened sheet of glass, is sequentially brought into the bending station, where the rod is pressed into the surface of the glass as the glass sheet is bent by the press bending molds. In the second preferred embodiment, a rod member is mounted against the face of one of the press bending molds and is heated in place by electrical means. In this embodiment, the rod may take the form of a hollow tube containing an electrical resistance heater element.

THE DRAWINGS

FIG. 1 is a perspective view of a bent glass sheet having an accent line.

FIG. 2 is an enlarged cross-sectional view taken along line 2—2 in FIG. 1 showing the deformation in the glass surface which characterizes an accent line (shown somewhat exaggerated for the sake of illustration).

FIG. 3 is a schematic end view of a press bending station receiving a sheet of glass and a rod for creating an accent line, both supported from an overhead carriage.

FIG. 4 is a side view of one side of the bending press taken along line 4—4 in FIG. 3.

FIG. 5 is a schematic plan view of the press bending station of FIG. 3 in the open position.

FIG. 6 is a schematic plan view of the press bending station of FIG. 3 in the closed position.

FIG. 7 is a schematic end view of a press bending station incorporating the preferred embodiment of an electrically heated accent line-impressing rod mounted on a pressing mold.

FIG. 8 is a side view taken along line 8—8 in FIG. 7 of one side of the bending press.

DETAILED DESCRIPTION

The methods of producing accent lines of the present invention are useful in conjunction with methods and apparatus for press bending glass sheets which are well known in the art. In particular, the pertinent types of press bending techniques are those in which relatively rigid complementary bending molds close upon opposite sides of a heat-softened glass sheet and engage major portions of both sides of the glass sheet so as to impart the desired curvature thereto. A particular press bending process with which the present invention is illustrated herein is the type wherein each glass sheet is hung vertically from tongs and is pressed between horizontally reciprocated bending molds. This type of press bending arrangement is well known in the art, as exemplified by U.S. Pat. No. 3,367,764 to S. L. Seymour, and a detailed description of the press bending apparatus itself should not be necessary for an understanding of the present invention. However, it should be understood that other press bending arrangements may be employed with the present invention, such as the conventional type of arrangement where each glass sheet is conveyed horizontally between upper and lower bending molds which are vertically reciprocated.

FIG. 1 depicts an example of a completed product made in accordance with the present invention, which comprises a bent sheet of glass 10 having an accent line 11 extending from one side to the other. Such a product would typically be employed as an automobile rear window. In FIG. 2, the enlarged cross-sectional view of the portion of the bent glass sheet in the region of the accent line 11 shows a slight depression in the glass surface, which contributes to the appearance of the accent line. The depth of the depression may be very slight since it is the disturbance of optical uniformity which renders the accent line visible. Part of the optical disturbance may be thermally induced beneath the glass surface as a result of contact with the relatively cool rod member. Thus, the accent lines of the present invention are characterized by a slight surface depression, but the depth of this depression is not necessarily the controlling factor, and in some cases, may be barely perceptible.

In FIGS. 3 and 4, a sheet of glass 10, still in the unbent state, is shown vertically hung from tongs 15 in a press bending station, having been heated to a softened condition suitable for bending in a furnace (not shown). The particular tong construction is not critical to the present invention and is well known in the art. An example of a suitable tong arrangement may be seen in U.S. Pat. No. 3,089,727. A typical carriage arrangement for supporting the tongs is depicted in FIG. 4. The carriage is based on a main frame 16 which may be comprised of a pair of angle irons spaced apart to receive a number of vertically extending threaded shafts 17 therebetween. The lower end of each shaft 17 is affixed to a yoke member 18 which in turn pivotably supports a cross-bar 19 on which the tongs 15 are hung. The entire carriage assembly may be supported from above by straps 20, the upper ends of which may be affixed to a car which rides on an overhead stub roller conveyor (not shown).

When the carriage and the glass sheet supported thereon are stopped in the bending station as shown in FIGS. 3 and 4, the glass sheet is aligned between a male press bending member 21 and a female press bending member 22. The face of each of the bending molds may be comprised of a relatively flexible sheet of metal (not shown) covered with a fiber glass fabric 23 and fastened by a plurality of adjusting bolts 24 to a stiffening plate 25. The stiffening plate 25 is in turn affixed to a back-up plate 26 by a plurality of bolts 27. Each bending mold assembly is carried on a horizontally reciprocating ram 28.

The novel feature is the provision of a rigid line-impressing member, which in the embodiment of FIGS. 3 and 4 is a solid rod 30 of stainless steel, for example, extending downwardly from the glass supporting carriage through the space between the glass sheet and the face of the male bending mold 21. The other end of rod 30 may be bent to an inverted U-shape, the short leg of which is received in tubular sleeve member 31, which in turn is affixed to a vertically extending rod 32. The rod 32 is supported on carriage frame 16 and may be threaded and fastened by means of nuts so as to provide vertical and rotational adjustment to the location of sleeve 31, if desired. Since it is mounted on the carriage, the impression rod 30 is conveyed through the furnace and is heated along with a glass sheet. The metal rod heats more slowly than the glass sheet, but it has been found that at the end of the heating cycle for the glass, the rod has increased in temperature sufficiently to avoid thermal shock when it is subsequently brought into contact with the glass surface in the bending press. A minimum of about 650° F. (340° C.) for the rod has been found to be practical. Rod temperatures above 950° F. (510° C.) are preferably avoided to prevent sticking and fusing of the rod to the glass. The glass is typically at a temperature of about 1100° F. (590° C.) to 1250° F. (680° C.) at the time of bending. A stainless steel rod ⅛ inch (3 millimeters) in diameter has been found to be satisfactory. The diameter of the rod may vary somewhat, although thinner rods may be more susceptible to bending and thicker rods may interfere more with the closing of the bending molds.

Bifurcated guides 35 may be provided at the upper and lower edges of the male bending mold to assure proper alignment of the line-impressing rod 30 with the mold face. As seen from above in FIGS. 5 and 6, the guide 35, as it is moved forward toward the rod 30 by the closing of the bending molds 21 and 22, engages the rod and restrains the rod against lateral movement when the rod becomes lodged in the narrow crotch portion of the guide. In FIG. 5, the glass sheet 10 and the rod 30 have come to a stop in the bending station with the rod 30 before the guide 35. In FIG. 6, the bending molds have closed upon the glass sheet and the rod 30, which has become wedged into the guide 35. Usually, the impression rod 30 is forced into the soft glass surface only a minor portion of the diameter of the rod. Thus, a slight gap in the vicinity of the rod may be provided between the glass sheet surface and the face of the male mold when the molds are in full engagement with the glass sheet in order to prevent overbending of the glass sheet and excess impressing of the rod into the glass. Such a gap is shown in FIG. 6.

FIGS. 7 and 8 illustrate a preferred embodiment of the present invention wherein the impression rod comprises an electrically heated element affixed to the face of a press bending mold. The press bending apparatus shown in FIGS. 7 and 8 is the same as that in FIGS. 3 and 4 and like numerals refer to like elements. Instead of a rod which travels with the glass sheet supporting carriage, the preferred embodiment employs an electrically heated rod 40 which is shown clamped to the face of male press bending member 21 by means of clamps 41 near the top and bottom edges of the mold face. The rod 40 may constitute any slender, elongated, electrical resistance heating element, but is preferably a commercially available type of rod heater having a metallic tubular outer sheath (such as stainless steel), an electrical resistance heating element running through its center, and electrical insulating material between the heating element and the sheath. Electrical leads 42 extend from the opposite ends of the heater rod and may be connected to a source of electrical potential. Such heater tubes are sold under various tradenames, such as CHROMALOX (Emerson Electric Company, Pittsburgh, Pa., CALROD (General Electric Company, Schenectady, N.Y.), and WATROD (Watlow Electric Maufacturing Company, St. Louis, Mo.). An advantage of this type of heated rod is that there are no exposed electrical heating elements, thus reducing electrical shock hazards. A specific heater rod which has been found to operate satisfactorily has an outer diameter of 0.20 inches. As in the previous embodiment, the operating temperature at the surface of the heater rod is preferred to be between about 650° F. (340° C.) and 950° F. (510° C.). In order to assure the staightness and alignment of the rod 40, it may be desirable to cut a groove into the surface of the metal shaping plate which underlies the fiber glass cover 23 behind the rod 40 so that the rod 40 will partially nest into the groove. It may also be helpful to provide a row of adjusting bolts 24 in direct alignment behind the rod 40 so as to provide accurate adjustability to the depth to which the rod 40 is pressed into the glass along each portion of its length.

The foregoing description has dealt solely with accent lines which are straight lines, but it should be understood that the word "line" as used herein is intended to encompass curved lines as well as straight lines. Also included are pluralities of curved and/or straight lines producing patterns or figures on glass sheets. Other variations and modifications which are obvious to those of skill in the art may be resorted to without departing from the spirit and scope of the invention as set forth in the claims.

I claim:

1. A method for imparting an accent line to a glass sheet comprising:

heating a glass sheet to a softened condition, supporting the heated glass sheet in a press bending station between an opposed pair of complementary, substantially continuous shaping surfaces, supporting a rod-shaped impression member between one side of the glass sheet and one of the shaping surfaces in alignment with the desired path of the accent line on the glass sheet, closing the bending molds upon the glass sheet and the impression member, thereby pressing the impression member into the glass surface and creating distortion in the glass sheet along the line of contact between the impression member and the glass, separating the mold members, and cooling the glass sheet.

2. The method of claim 1 wherein the impression member is maintained at a temperature above about 650° F. (340° C.) during the pressing step.

3. The method of claim 2 wherein the temperature of the impression member is maintained below about 950° F. (510° C.) during the pressing step.

4. The method of claim 2 or 3 wherein the impression member is conveyed with each glass sheet through a heating chamber prior to being conveyed to the bending station.

5. The method of claim 2 or 3 wherein the impression member is carried on the face of one shaping surface and is heated by electrical resistance heating means.

* * * * *